United States Patent
Grah et al.

(10) Patent No.: US 7,414,972 B2
(45) Date of Patent: Aug. 19, 2008

(54) JITTER CONTROLLED WFQ ALGORITHM ON NETWORK PROCESSORS AND LATENCY CONSTRAINED HARDWARE

(75) Inventors: Adrian Grah, Kanata (CA); Bin Du, Ottawa (CA)

(73) Assignee: Alcatel Lucent, Paris (FR)

( * ) Notice: Subject to any disclaimer, the term of this patent is extended or adjusted under 35 U.S.C. 154(b) by 657 days.

(21) Appl. No.: 11/032,074

(22) Filed: Jan. 11, 2005

(65) Prior Publication Data

US 2006/0153071 A1 Jul. 13, 2006

(51) Int. Cl.
*G01R 31/08* (2006.01)

(52) U.S. Cl. .................. 370/235; 370/230; 370/412; 370/468; 710/52

(58) Field of Classification Search .................. None
See application file for complete search history.

(56) References Cited

U.S. PATENT DOCUMENTS

| | | | | |
|---|---|---|---|---|
| 6,157,654 | A * | 12/2000 | Davis | 370/412 |
| 6,434,160 | B1 * | 8/2002 | Davis | 370/412 |
| 6,526,060 | B1 * | 2/2003 | Hughes et al. | 370/395.4 |
| 6,993,040 | B2 * | 1/2006 | Davis | 370/412 |
| 7,046,688 | B2 * | 5/2006 | Amou et al. | 370/418 |
| 2002/0097734 | A1 * | 7/2002 | Amou et al. | 370/412 |
| 2003/0076834 | A1 * | 4/2003 | Davis | 370/395.1 |
| 2004/0095885 | A1 * | 5/2004 | Yang | 370/235.1 |

OTHER PUBLICATIONS

West, R., et al., Scalable Scheduling Support for Loss and Delay Constrained Media Streams, Georgia Inst. of Tech.

Bennett, J., et al., Hierarchical Packet Fair Queueing Algorithms, Carnegie Melon Univ.

Demers, A., et al., Analysis and Simulation of a Fair Queueing Algorithm, Xerox PARC, 1989.

Bux, W. et al., Technologies and Building Blocks for Fast Packet Forwarding, IEEE Comm. Magazine, Jan. 2001.

Crowley, P., et al., Characterizing Processor Architectures for Programmable Network Interfaces, Univ. of Washington, 2000.

Krishnamurthy, R., et al., A Network Co-Processor-Based Approach to Scalable Media Streaming in Servers, Georgia Inst. of Tech.

Liu, C.L., et al., Scheduling Algorithms for Multiprogramming in a Hard-Real-Time Environment, Assoc. for Computing Machinery, Inc., 1973.

(Continued)

*Primary Examiner*—Bob A Phunkulh

(57) ABSTRACT

Systems and methods of reducing service jitter in WFQ scheduling schemes used in packet traffic management are described. Service jitter is the variance in time between when a queue should have been selected for servicing and when it was actually serviced. The service jitter is generally not a problem in lower speed applications but in a high speed implementation such as a OC192 device latency can lead to downstream service contract violations. According to the invention jitter is controlled by applying a dampening factor to a difference amount that is used by the WFQ process to adjust its timing of queue selection. The difference amount is queue-specific and is a running difference between calculated and actual queue servicing times.

17 Claims, 3 Drawing Sheets

OTHER PUBLICATIONS

Zhou, W., et al., Queue Management for QoS Provision Build on Network Processor, Tsinghua Univ.

Stephens, D., et al., Implementing Scheduling Algorithms in High-Speed Networks.

Stiliadis, D., et al., Efficient Fair-Queueing Algorithm for Packet-Switched Networks.

Austin, T., et al., Tetra: Evaluation of Serial Program Performance on Fine-Grain Parallel Processors, Univ. of Wisconsin-Madison, Jul. 11, 1993.

Zhang, H., Service Disciplines for Guranteed Performance Service in Packet-Switching Networks.

* cited by examiner

US 7,414,972 B2

JITTER CONTROLLED WFQ ALGORITHM ON NETWORK PROCESSORS AND LATENCY CONSTRAINED HARDWARE

FIELD OF THE INVENTION

This invention relates to the management of packet traffic using a weighted fair queuing (WFQ) scheme and more particularly to systems and methods of reducing service jitter in such schemes when implemented at very high speeds.

BACKGROUND OF THE INVENTION

In data traffic management it is known to implement a WFQ scheme to achieve fair scheduling of multiple queues at a network interface. An example of a WFQ scheduler implementing eight classes of service is illustrated in FIG. 1. The WFQ scheduler is used to schedule servicing of queues having classes of service CoS3 to CoS7. Classes of services CoS0 to CoS2 have been assigned a high priority rating and are typically serviced using one or more servicing algorithms such as an exhaustive round robin scheme.

In FIG. 1 classes of service CoS3 to CoS7 are serviced using the WFQ scheme wherein each CoS has assigned thereto a service weight which is factored into the servicing scheme.

In general, WFQ is an algorithm used to select a queue amongst a multitude of queues for servicing at any point in time. Each queue on a WFQ structure is assigned a weight and the effect of service provided to a queue is the proportion of the queue's weight divided by the sum of all of the queues' weights.

The present invention is particularly directed to WFQ implementations for use on very high speed interfaces in order to deal with the constraints of the implementing devices which may be, for example, network processors, field programmable gate arrays (FPGA) and applications specific integrated circuits (ASIC). Typical of the constraints of implementing devices are the number of processing cycles any single packet may consume within the devices, and the latency associated with accessing a packet's context. Such constraints make it difficult to impossible to use theoretically ideal WFQ algorithms. Furthermore, if special care is not taken with the optimizations necessary for WFQ implementations, parasitic second order effects such as service jitter can become problematic, potentially resulting in down stream service level agreement (SLA) violations.

In the present application jitter can be defined as the variance in time between when a queue should have theoretically been selected for service and the actual time the queue has been selected. The goal of the WFQ algorithm of the present application is to address the performance constraints on very high speed interfaces while maintaining control of the jitter characteristics of the algorithm.

Weighted fair queuing schemes are well known and are described extensively in the prior art. None of the prior art, of which Applicants are aware, account for the performance constraints associated with network processors nor do any prior art implementations deal with maintaining bounds on jitter characteristics as jitter is non-existent with an ideal implementation of a WFQ.

Accordingly, there is a present requirement, which requirement will become even more desirable in the future, to reduce or eliminate service jitter in implementations involving very high speeds.

SUMMARY OF THE INVENTION

The present invention addresses the problem of reducing service jitter in WFQ schemes commonly used in packet traffic management. The present invention controls jitter characteristics of a WFQ process by applying a dampening factor to a difference amount that is used by the WFQ process to adjust its timing of queue selection. The difference amount is queue-specific and is a running difference between a calculated and actual Vperiod for a given queue.

Therefore, in accordance with a first aspect of the present invention there is provided a method of managing packet traffic using a weighted fair queuing (WFQ) scheme, the WFQ scheme including a Wfq process for selecting a queue to be serviced and Dq process for dequeuing a packet to be processed, the method comprising creating a feedback loop between respective processes and feeding back to the WFQ process from the Dq process a queue specific damping difference value used by the WFQ process to select a queue for servicing.

In accordance with a second aspect of the present invention there is provided a system for managing packet traffic using a Weighted Fair Queuing (WFQ) scheme, the WFQ scheme including a Wfq process for selecting a queue to be serviced and a Dq process for dequeuing a packet to be processed, the system comprising: a closed loop feedback control means between respective processes; and means for determining and feeding back to the Wfq process from the Dq process a queue-specific dampening difference value used by the Wfq process to select a queue for servicing.

BRIEF DESCRIPTION OF THE DRAWINGS

The invention will now be described in greater detail with reference to the attached drawings wherein.

DETAILED DESCRIPTION OF THE INVENTION

Figure 2:
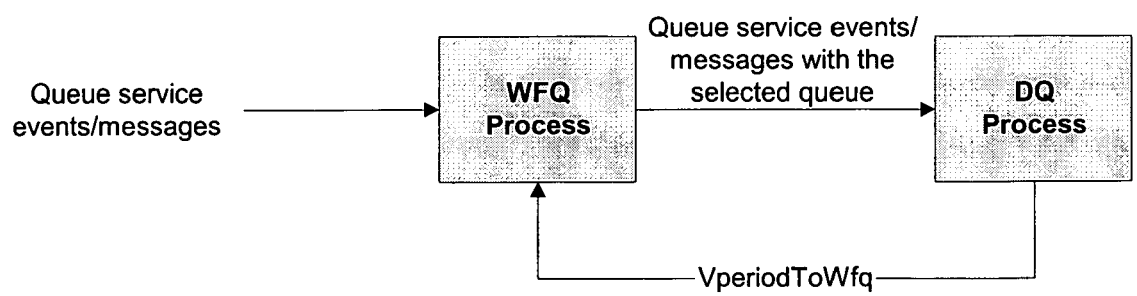
FIG. 2 illustrates the processes and management in a WFQ scheme according to the present invention.

The WFQ functionality according to the present invention is distributed amongst two separate but related processes. There is the Wfq process and the Dq process as shown in FIG. 2. Messages are passed between processes to signal events and pass information. In a network processor (NP) implementation, these processes can be implemented through the use of different micro engines (MEs). The Wfq process receives events from an upstream process indicating the arrival of packets to a queue as well as messages from the downstream Dq process. The most important message the Wfq process receives is the VperiodToWfq message from the Dq process which is used to correct assumptions made by the Wfq process when selecting a queue for service. The Dq process receives messages from the Wfq process to indicate that a queue has been selected for servicing, and what the Wfq process assumed for the selected queue's Vperiod.

In general, the Wfq process maintains a timestamp for each queue and selects the queue with the lowest timestamp value for servicing. Alternatively, a calendar may be maintained as is well known to one skilled in the art. The selected queue's timestamp, or placement on the calendar, is then updated with a value supplied by the Dq process which is an adjusted value based on the queue's weight, the packet size of the previous packet selected from that queue, and the history of values used. This is done because there is a latency involved between the time a queue is selected and the time at which the packet size is known, as discussed below. Finally, the current timestamp is updated and a message is sent to the Dq process.

The Dq process, generally speaking, receives Dq messages from the Wfq process including the Vperiod used. It is the responsibility of the Dq process to remove, from the selected queue, the packet at the head of the queue, thereby dequeueing it. The Dq process then determines the actual Vperiod that the Wfq process should have used for this packet that is equal to the dequeued packet's size multiplied by the queue's weight. For each queue, a remainder is maintained such that the running difference between what the Wfq process used as a Vperiod and what it should have used is tracked. This remainder value is then dampened and fed back to the Wfq process which it will use to update the queue's timestamp the very next time the queue is selected. This dampening is critical to the reduction of jitter in this algorithm.

Figure 1:
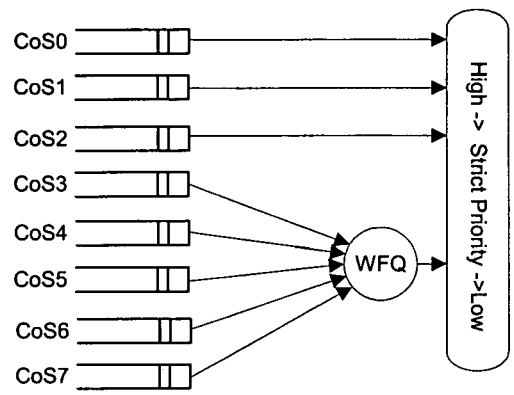
FIG. 1 is an overview of a WFQ scheme contained in an implementation of an eight class of service scheme.

For the WFQ example shown in FIG. 1, the WFQ implementation is based on the comparison of virtual timestamps, although calendars can be used where a large number of queues exist on the WFQ structure. Each queue has a virtual timestamp and is initialized to zero at startup. The virtual timestamp of a non-empty queue is updated each time a queue is selected for service as follows, $$\text{Timestamp} = \text{current\_timestamp} + DqToWfq\_DqV\text{period}$$

Where current_timestamp is always set to the timestamp of the queue just serviced. DqToWfq_DqVperiod is received from the Dq process and is related to the previous packet length and the weight of the queue that the packet came from. The non-empty queue with the lowest virtual timestamp is chosen for service.

Due to any internal device data movement latencies, the DqToWfq_DqVperiod, which is used to update the timestamp in the Wfq process, is not exactly equal to the product of the dequeued packet's length multiplied by weight, but adjusted and dampened as discussed below. Latencies are introduced by, for example:

Dequeueing of the packet and fetching its lengthWeightProduct from its buffer descriptor. The dequeueing and fetching buffer descriptor operations are memory operations. Due to the limitation of memory technology, the latency are usually higher than the number of processing cycles any single packet may consume within the devices on high-speed interfaces, e.g. OC192.

DQ process sending the DqToWfq_DqVperiod message to Wfq process.

Because of these latencies, the Wfq process might use an old lengthWeightProduct which increases the jitter or burstiness of the WFQ. As a remedy, the Wfq process will send a message to the Dq process containing WfqToDq_DqVperiod=DqToWfq_DqVperiod. The DQ process keeps track of difference between WfqToDq_DqVperiod and lengthWeightProduct and feeds back a new and adjusted DqToWfq_DqVperiod.

Figure 3:
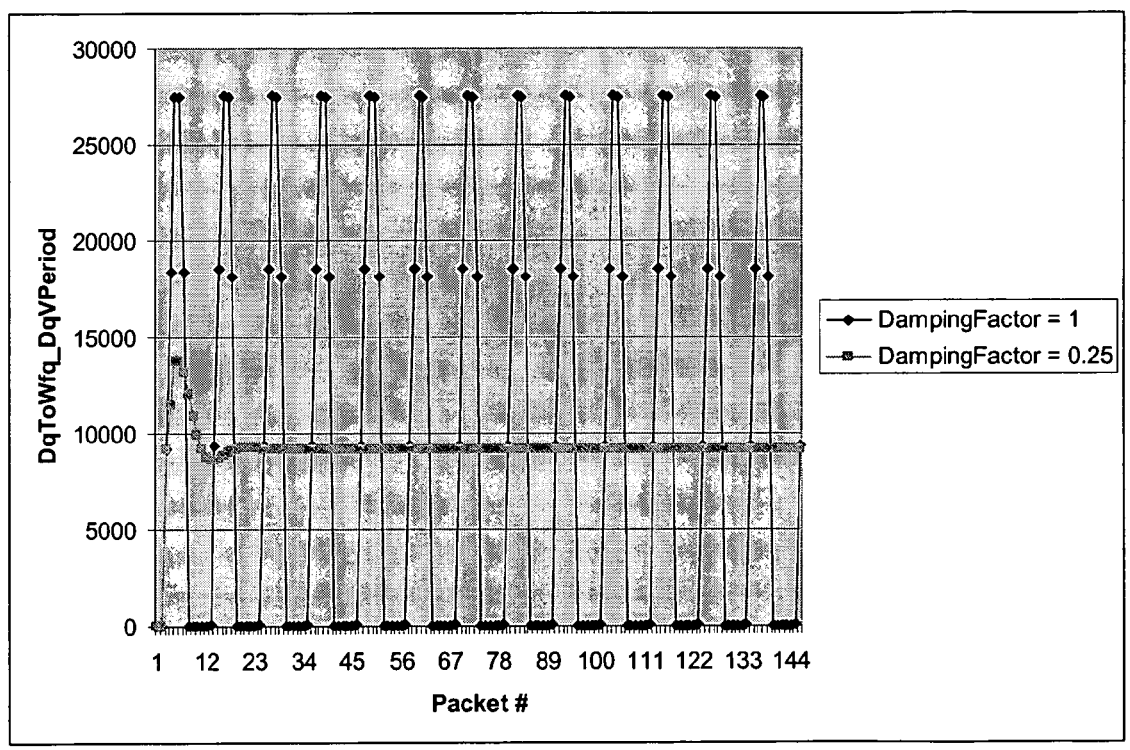
FIG. 3 illustrates the effect of the damping factor on the behaviour of the scheduling scheme.

This represents a feedback loop system where feedback is presented to the Wfq process subject to a delay, and a stimulus is presented to the Dq process. Depending on the difference between the DqToWfq_DqVperiod used by the Wfq and the lengthWeightProduct retrieved by the Dq process, and the latencies involved, oscillations will occur in the DqToWfq_DqVperiod value. Such oscillations directly correspond to jitter and burstiness in queue servicing. It is the role of the damping factor to ensure that oscillations are controlled and die out under steady state conditions. FIG. 3 demonstrates the effect of applying a damping factor. In this example, a two cell time latency is assumed, and a single stream of 9192 byte packets arrive to a queue whose weight is normalized to 1.

The following is the pseudo code for the Dq process:

```
[Init]
    Remainder =40 * (1/ dampfactor – 1)
    DqToWfq_DqVperiod = 40
    Send DqToWfq_DqVperiod to the Wfq process.
[Every DQ operation]
    Remainder=Remainder+(lengthWeightProduct –
    WfqToDq_DqVperiod)
    Check if Remainder is wrapped around in the debug condition.
    If Remainder < 0,
        DqToWfq_DqVperiod =0.
    Else if Remainder > Max_DqVperiod,
        DqToWfq_DqVperiod = Max_DqVperiod.
    Else
        DqToWfq_DqVperiod = Remainder * dampfactor
    Send DqToWfq_DqVperiod to the Wfq process.
```

Figure 4:
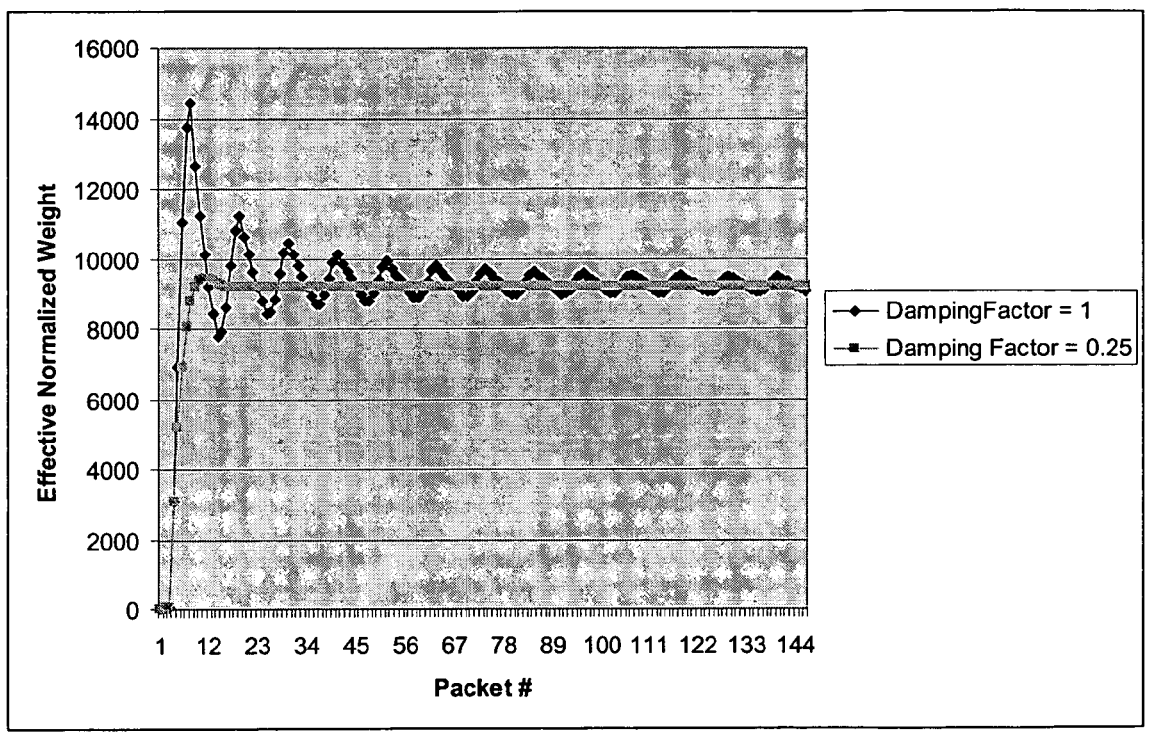
FIG. 4 illustrates the effect of a damping factor on the average effective queue weight.

The dampfactor is 0.25 by default in this implementation, and used for reducing the swing of DqToWfq_DqVperiod and thereby reducing overall jitter and burstiness. Simulations have shown that without this damping factor, there is significant jitter and burstiness in queue servicing, although long term behavior is still correct. FIG. 4 illustrates that even though the long term weighting without damping is correct, with damping, packet streams converge faster to their configured weight value for packets of size 9192 Bytes. This jitter is a result of oscillations in the DqToWfq_DqVperiod value calculated by the Dq process and may result in the violation of downstream SLAs.

This is a simple algorithm that, on a NP, can be executed in real time while maintaining control on the jitter characteristics of queue servicing. This algorithm is also applicable to general purpose processors which require a fast and efficient WFQ algorithm. This algorithm may also be applied to ASIC and FPGA implementations of a WFQ where similar performance constraints exist.

Although preferred embodiments of the invention have been described and illustrated it will be apparent to one skilled in the art that numerous changes can be introduced without departing from the basic concept. It is to be understood, however, that such changes will fall within the full scope of the invention as defined by the appended claims.

We claim:

1. A method of managing packet traffic using a Weighted Fair Queuing (WFQ) scheme, the WFQ scheme including a Wfq process for selecting a queue to be serviced and a Dq process for dequeuing a packet to be processed, the method comprising:

creating a feedback loop between respective processes; and feeding back to the Wfq process from the Dq process a queue-specific dampening difference value used by the Wfq process to select a queue for servicing, wherein the queue-specific dampening difference value is determined from the following algorithm, where DqToWfq_DqVperiod is received from the Dq process and is related to a previous packet length and a weight of a queue that the previous packet came from:

Remainder=Remainder+(lengthWeightProduct−WfqToDq_DgVperiod):

If Remainder is less than zero, DqToWfq_DqVperiod=0:
If 0≦Remainder>Max_DqVperiod, then DqToWfq_DqVperiod=Max_DqVperiod:
Otherwise DqToWfq_DqVperiod=Remainder * a dampening factor.

2. The method as defined in claim 1 for use in managing high speed traffic.

3. The method as defined in claim 2 for use in managing communications traffic for telecommunications services.

4. The method as defined in claim 2 for use in managing traffic relating to prioritized database access.

5. The method as defined in claim 2 for use in process management in multiprocessor operating systems.

6. The method as defined in claim 1 wherein the dampening difference value is based on a virtual time stamp for each queue.

7. The method as defined in claim 1 for reducing jitter in high speed communications systems.

8. A method of managing packet traffic using a Weighted Fair Queuing (WFQ) scheme, the WFQ scheme including a Wfq process for selecting a queue to be serviced and a Dq process for dequeuing a packet to be processed, the method comprising:
    creating a feedback loop between respective processes; and
    feeding back to the Wfq process from the Dq process a queue-specific dampening difference value used by the Wfq process to select a queue for servicing,
    wherein the dampening difference value is based on a virtual time stamp for each queue and for each queue a remainder value is maintained whereby a running difference between what the Wfq process used as a Vperiod and what it should have used is tracked.

9. The method as defined in claim 8 wherein the remainder value is dampened and fed back to the Wfq process via the feedback loop.

10. The method as defined in claim 9 wherein the remainder value is used to update a queues timestamp the very next time the queue is selected.

11. A system for managing packet traffic using a Weighted Fair Queuing (WFQ) scheme, the WFQ scheme including a Wfq process for selecting a queue to be serviced and a Dq process for dequeuing a packet to be processed, the system comprising:
    a closed loop feedback control means between respective processes; and means for determining and feeding back to the Wfq process from the Dq process a queue-specific dampening difference value used by the Wfq process to select a queue for servicing,
    wherein the queue-specific dampening difference value is determined from the following algorithm, where DqToWfq_DqVperiod is received from the Dq process and is related to a previous packet length and a weight of a queue that the previous packet came from:
Remainder=Remainder+(length WeightProduct−WfqToDq_DgVperiod):
If Remainder is less than zero, DqToWfq_DqVperiod=0:
If 0≦Remainder>Max_DqVperiod, then DqToWfq_DqVperiod=Max_DqVperiod:
Otherwise DqToWfq_DqVperiod=Remainder * a dampening factor.

12. The system as defined in claim 11 implemented in a network processor.

13. The system as defined in claim 11 implemented in an application specific integrated circuit (ASIC).

14. The system as defined in claim 11 implemented in a field programmable gate array (FPGA).

15. The system as defined in claim 11 wherein the Wfp process receive event messages from an upstream process indicating arrival of packets to a queue and messages from the Dq process.

16. The system as defined in claim 15 wherein the message received from the Dq process is a VperiodToWfq message.

17. The system as defined in claim 16 wherein the VperiodToWfq message is used to correct timing assumptions made by the Wfq process.

* * * * *